United States Patent [19]

Isobe

[11] 4,030,374

[45] June 21, 1977

[54] FRONT DERAILLEUR FOR BICYCLE

[75] Inventor: Mitsuhide Isobe, Sakai, Japan

[73] Assignee: Shimano Industrial Company, Limited, Osaka, Japan

[22] Filed: Dec. 15, 1975

[21] Appl. No.: 640,790

[30] Foreign Application Priority Data

Dec. 12, 1974 Japan .......................... 49-143966
Dec. 12, 1974 Japan .......................... 49-143967

[52] U.S. Cl. ................................ 74/217 B; 74/242
[51] Int. Cl.² ..................... F16H 7/22; F16H 11/08
[58] Field of Search .......................... 74/242, 217 B

[56] References Cited

UNITED STATES PATENTS

| 3,813,955 | 6/1974 | Huret et al. ...................... 74/217 B |
| 3,890,847 | 6/1975 | Dian ................................. 74/217 B |
| 3,903,751 | 9/1975 | Dian ................................. 74/217 B |

*Primary Examiner*—Samuel Scott
*Assistant Examiner*—Allan R. Burke
*Attorney, Agent, or Firm*—Stevens, Davis, Miller & Mosher

[57] ABSTRACT

A front derailleur for a bicycle, for shifting a drive chain to one sprocket wheel of a multispeed front gear, has a fixing member, two parallelogrammatic linkage members, a chain guide, and return springs for restoring the chain guide. The fixing member is pivoted to an arm securing one terminal of a Bowden wire. A transmitting member for transmitting swinging motion of the arm to one of the linkage members is provided between the arm and the one linkage member, is supported at its one end to one of the arm and linkage member, and abuts at the other end against the other of both the members by being imparted with an elastic force greater than that of the return springs, so that when the chain guide is subjected to resistance within a given range the transmitting member transmits without displacement the arm motion to the chain guide to be laterally moved for changing the bicycle speed. On the other hand, when the resistance exceeds the given range, the transmitting member transmits no motion of the arm to the chain guide but is displaced to be energized, whereby it can, when the resistance becomes less than the given range, carry out the speed change by forcibly moving the chain guide using the stored elastic energy in it.

5 Claims, 7 Drawing Figures

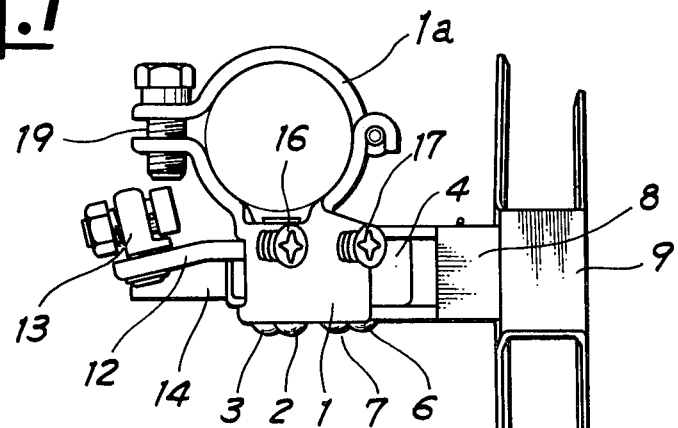
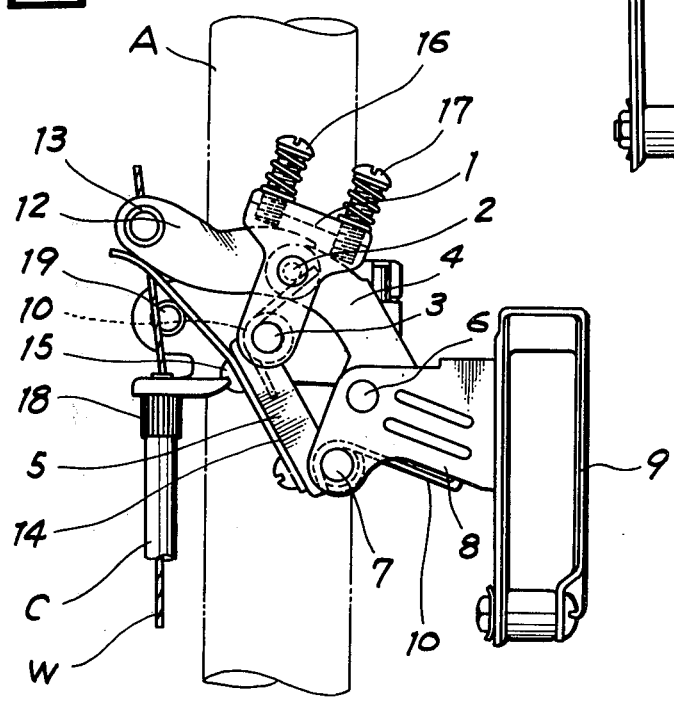

FRONT DERAILLEUR FOR BICYCLE

This invention relates to a front derailleur and more particularly to a front derailleur for a bicycle, which is used for changing speed by shifting a drive chain to a selected one of the sprocket wheels of a front gear comprising a plurality of sprocket wheels coaxially assembled to a crank shaft.

Conventionally, this kind of derailleur is so constituted that to a fixing member secured to a bicycle frame member is pivoted parallel linkage members through two pins. The parallel linkage members pivotally support therewith a chain guide in swingingly movable relation thereto. One of the linkage members extends to fix at the foremost end thereof one terminal of a Bowden wire and the fixing member supports therewith one terminal of an outer cable of the wire so that the wire is pulled to cause the linkage member to be moved against return springs to result in lateral movement of the chain guide thereby introducing a drive chain into a selected one of a multistage front gear of the bicycle.

The conventional front derailleur cannot perform the drive chain shifting without rotation of the front gears, regardless of whether the bicycle is moving or is at rest. If one forcibly operates the derailleur when the gears are not rotating either the pins are broken, or the Bowden wire is forcibly extended to the point of being. As a result, proper change of speed is impeded.

Also, the front derailleur must adjust the length of the Bowden wire with respect to the outer cable in order to properly move the chain guide to ensure shifting of the drive chain, and a mechanism is required for the adjustment.

This invention has been designed to eliminate the aforesaid drawbacks in the conventional front derailleur. A main object of the invention is to provide a front derailleur which is adapted to have a transmitting member capable of being displaced to absorb an excessive pull of the Bowden wire when loads are applied to the chain guide over a given range in shifting the chain guide by controlling the wire for changing speed, so that the derailleur may prevent the pins from being broken by an excessive load imparted thereto and may prevent the Bowden wire from being subjected to an excess pull, and may carry out the desired speed change with the chain guide movement by means of the stored energy resulting from the displacement of the transmitting member when the abovementioned loads are removed. Another object of the invention is to provide a front derailleur which is capable of absorbing any slight difference between the amount of extension and contraction of the Bowden wire so that the derailleur may carry out a proper speed change even with no adjustment of the relative length of the wire to an outer cable.

The derailleur in accordance with the invention is characterized in that an arm having one terminal of the Bowden wire fixed thereto is formed separately from linkage members to be pivoted to a fixing member independent of the linkage members. Between the arm and one of the linkage members is provided a transmitting member for transmitting, to the linkage members, a swinging motion of the arm by a pull of the Bowden wire. The transmitting member is movable so that the linkage members may be parallelogrammatically moved to allow a chain guide to be laterally moved when the chain guide is not heavily loaded to be moved during rotation of the front gear. When the chain guide is loaded above a given range, the transmitting member is displaced to thereby absorb the force of the pull of the Bowden wire and store the energy of the displacement.

The aforesaid objects of the invention and others will be apparent from the following detailed description and the characteristics of the invention will be fully understood in the description hereinafter in accordance with the accompanying drawings, in which:

FIG. 1 is a plan view of a front derailleur of the invention,

FIG. 2 is a front view of a front derailleur of an embodiment of the invention,

Figure 3:
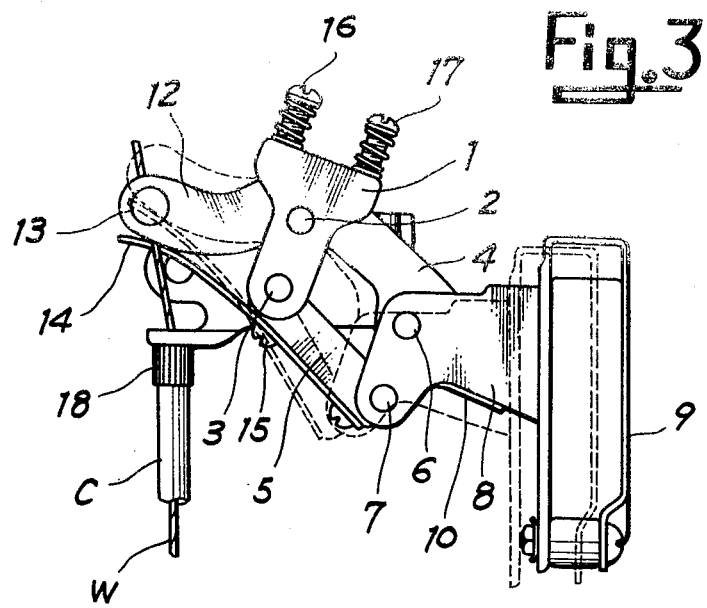
Figure 4:
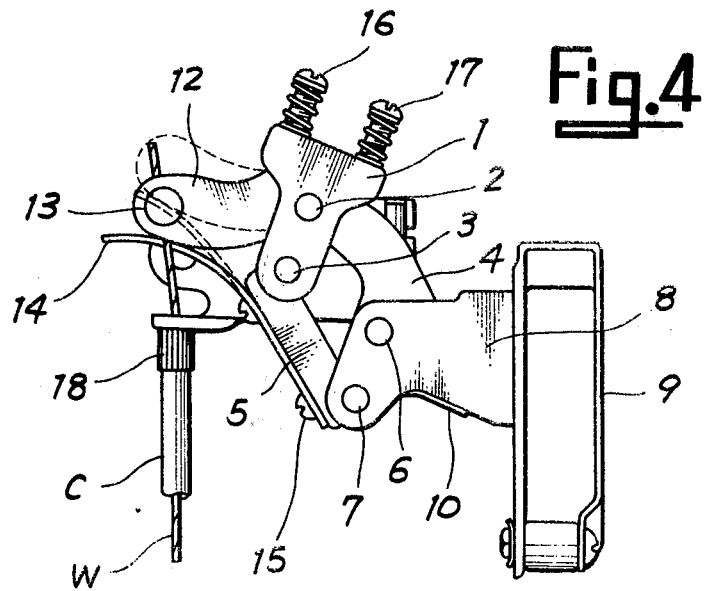
Figure 5:
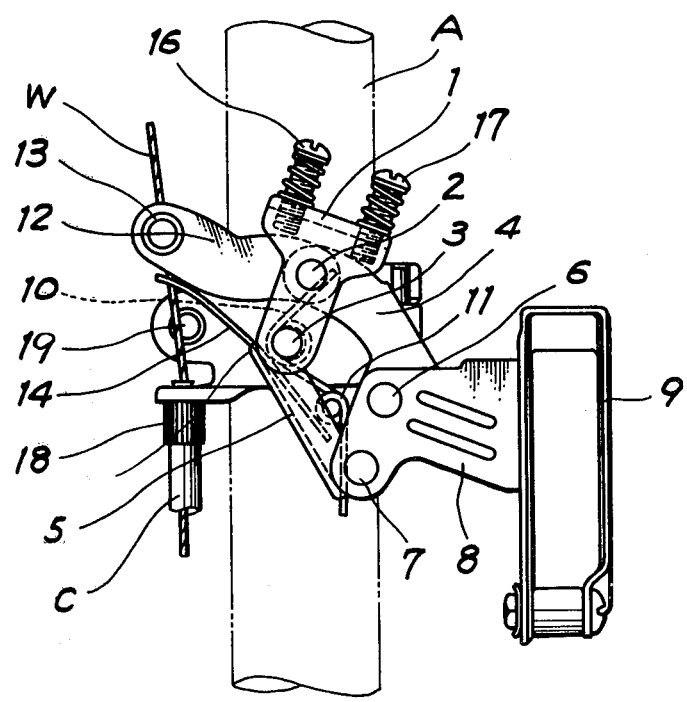
Figure 6:
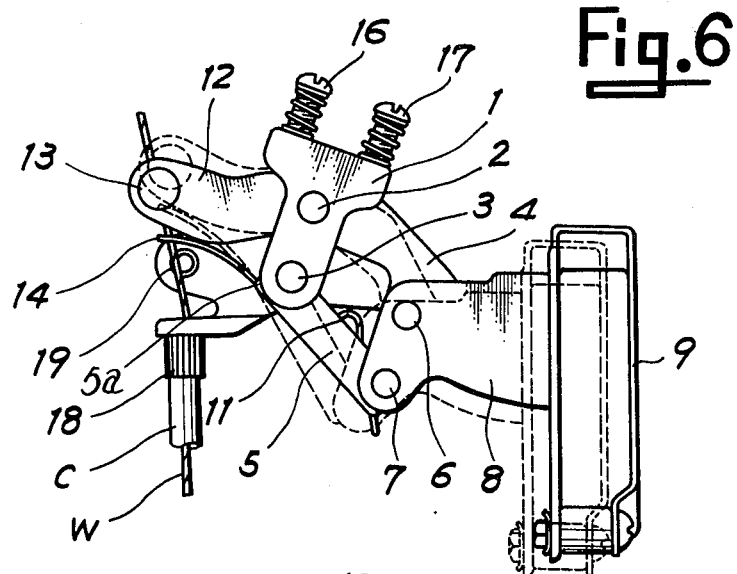
Figure 7:
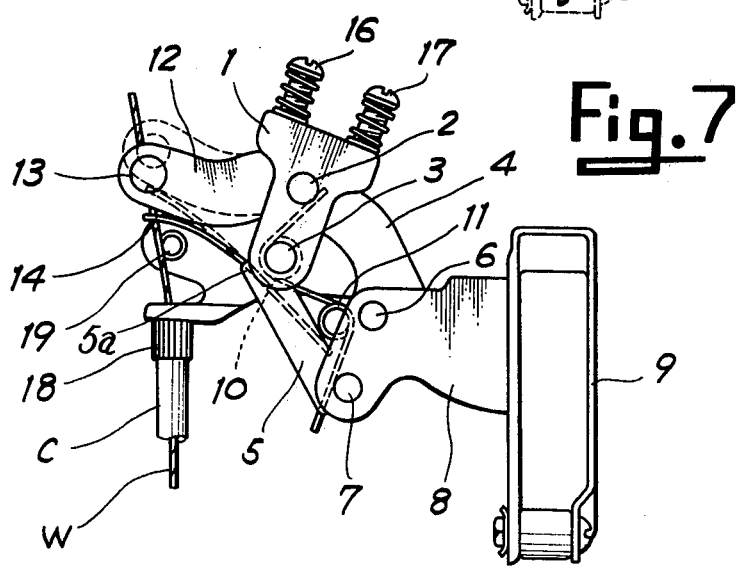

FIGS. 3 and 4 being front views illustrating the action of the front derailleur in FIG. 1 when operated for speed change, FIG. 3 shows the front derailleur in the normal condition of a transmitting member thereof, FIG. 4 shows the same in the displaced condition of the transmitting member, FIG. 5 is a front view of a modified embodiment of the invention, FIGS. 6 and 7 being front views illustrating the action of the derailleur in FIG. 5, FIG. 6 shows the normal condition of a transmitting member of the derailleur in FIG. 5, and FIG. 7 shows the displaced condition thereof.

Referring to the drawings, the reference numeral 1 designates a fixing member secured to a bicycle frame member A through a tightening band 1a. Two parallel linkage members 4 and 5 are pivotally supported by the fixing member 1 through a first pin 2 and a second pin 3 respectively. At the foremost end of each of the parallel linkage members 4 and 5 is mounted a support 8 through a third pin 6 and a fourth pin 7 which correspond to the first pin 2 and the second pin 3 respectively. A chain guide 9 is fixed to the support 8. The chain guide 9 is freely laterally movable by means of the parallelogram formed by the two parallel linkage members 4 and 5, the fixing member 1, and the support 8.

Return springs 10, 10, which are provided around the second pin 3 and the fourth pin 7 respectively, are always biasing the chain guide 9 toward the bicycle frame A and act to restore the chain guide 9 to its original position after displacement.

The reference numeral 12 designates an arm which is pivotally supported at one end thereof to the fixing member 1 together with a base of the one linkage member 4 through the first pin 2. The arm 12 extends, as shown in FIG. 2, away from the linkage member 4, is upwardly curved and formed in a gentle arc at the lower edge thereof. At the foremost end of the arm 12 is mounted a wire retainer 13 for a Bowden wire W.

A pin other than the first pin 2 could support the arm 12. However the use of the first pin for this purpose is economically advantageous since the number of pins is reduced.

The reference numeral 14 designates a transmitting member for transmitting to the linkage member 5 the swinging motion of the arm 12 caused by a pull of the Bowden wire W. The transmitting member is a leaf spring as shown in FIGS. 1 to 4.

The transmitting member 14 is provided between the arm 12 and the linkage member 5. The transmitting member 14 is, when formed of a leaf spring, fixed at one end thereof to either one of the arm 12 or the linkage member 5 and resiliently abuts, at the other end the other one of the arm 12 or the linkage member 5. In FIGS. 1 to 4, the transmitting member 14 is fixed at one end thereof to the linkage member 5 through screw bolts 15 and is curved at the other end so as to resiliently abut the arc-shaped lower edge of the arm 12.

The leaf spring has a greater elastic force than the return springs 10, 10, preferably about two times the latter. The transmitting member 14 always biases the arm 12 to the upper limit by means of the elastic force of the spring, i.e., until the arm abuts a stopper 16 of two adjustable stoppers 16, 17 on the fixing member 1.

When the Bowden wire W is pulled to move the arm 12, the transmitting member 14 relays the arm motion to the linkage member 5 so that the chain guide 9 may be laterally moved against the force of the return springs 10, 10 from the dotted line position to the solid line position shown in FIG. 3. At this time, when a resistance above a predetermined amount is applied to the chain guide 9 against its motion, namely, when sprocket wheels (not shown) of the front gear for shifting the drive chain are not rotating so that the chain guide bears any over-loads to be prevented from being moved, the transmitting member 14 is, as shown in FIG. 4, elastically deformed to be moved.

Now, the front derailleur of the invention, constructed as shown in FIGS. 1 to 4, will be described.

When the Bowden wire is pulled, the chain guide can, as a conventional one, be laterally moved against the force of the return springs 10, 10, during rotation of the front gear and in the absence of excessive loads imparted to the chain guide. At this time, the arm 12 swings around the first pin 2 by the pull of the wire to move the transmitting member 14. Since the transmitting member 14 has a greater elastic force than the return springs 10, 10, the swinging motion of the transmitting member 14 is conveyed without deformation thereof to the linkage member 5. As the result, the parallel linkage members 4 and 5 are parallelogramatically moved to shift the chain guide 9 against the force of the return springs 10, 10 to the solid line position in FIG. 3, whereby the drive chain is shifted to a selected one of sprockets of the front gear.

On the contrary, when loads above the given range are applied onto the chain guide to be restrained from being moved, such as, during non-rotation of the front gear, the arm 12 swings by a pull of the Bowden wire W to try to move the linkage member 4. However, the two linkage members cannot, even though the swinging motion of the arm is conveyed thereto through the transmitting member, move because of the nonrotated chain guide 9 so that the transmitting member 14 is, as shown in FIG. 4, deformed and moved from its dotted line position to the solid line position, thus relieving the strain on the wire.

As a result, the displacement of the transmitting member 14 may eliminate overstrain on the Bowden wire and the chain guide 9 is applied only with the difference between the elastic force of the transmitting member 14 and that of the return springs 10, 10 so that the linkage member 4 and the pins 3 and 7 are not damaged from by excessive force imparted thereto.

In addition, the transmitting member 14 can store therein the energy for changing speed due to the aforesaid displacement of the member so that the chain guide 9 may be readied for changing speed. As the result, upon rotation of the front gear by pedalling, the transmitting member 14 will restore to allow the linkage members 4 and 5 to be parallelogramatically moved thereby making it possible to shift the drive chain into a high speed stage.

The above mentioned embodiment has the transmitting member 14 in the form of a leaf spring to be elastically deformed for displacement. However, the transmitting member may, as shown in FIGS. 5 to 7, be formed of a plate which is not elastically deformable. The plate used for the transmitting member is supported at one end to either the linkage member 5 or the arm 12 in swingable relation thereto and elastically abuts at the other one end against the other of the linkage member 5 or the arm 12 through an elastic member 11, such as a coil spring, which is independent of the transmitting member 14 and acts against the motion thereof, so that the transmitting member may be moved from its position against the elastic member 11.

The transmitting member 14 (the plate) is shown in FIGS. 5 to 7. The plate 14 is bent at an approximately intermediate portion thereof toward the arm 12 to be engaged with a lengthwise end 5a of the linkage member 5 so that the bent intermediate portion of the plate may serve as a fulcrum for swinging motion thereof. The transmitting member 14 elastically abuts at the fore end thereof against the lower edge of the arm 12.

The aforesaid elastic member 11 is formed mainly of a coil spring having an elastic force greater than that of the return spring 10 which member is retained at one end thereof to the second pin 3 and at the other end to the fourth pin 7.

In addition, the elastic member 11 may be formed separately from the return spring and the former may be retained at both ends thereof to the second and fourth pins 3 and 7 respectively. Also, the return spring 10 may, as shown in FIG. 5, be extended at one end thereof, coiled at the intermediate portion and retained at the tip to the fourth pin 7, whereby both the return spring 10 and the elastic member 11 are made in one piece so that the front derailleur is simple to manufacture and assemble.

As in the former embodiment, the arm 12 is always upwardly biased to the upper limit, namely, to the extent that the arm 12 abuts against the stopper 16 of the adjustable stoppers on the fixing member 1, by means of the transmitting member 14 in elastic contact with the elastic member 11.

In the front derailleur constructed as aforesaid, the speed change by a pull of the Bowden wire is carried out in a manner that when the chain guide 9 bears loads no greater than the predetermined value during rotation of the front gear the arm 12 swings, as abovementioned, to move the linkage member 5 through the transmitting member 14 so that the two linkage members 4 and 5 may be parallelogramatically moved against the force of the return springs 10 to allow the chain guide 9 to travel from its dotted line position to the solid line position in FIG. 6 thereby making it possible to shift the drive chain into a selected sprocket of the front gear. On the other hand, when the aforesaid travel of the chain guide cannot be carried out because the chain guide 9 is imparted with loads above the given range resulting from, for example, nonrotation of the front gear, the arm 12 is swingingly moved by a pull of the Bowden wire, and the linkage members 4 and 5 are not moved even though the linkage member 4 is actuated with the arm. Therefore, the elastic member 11 is forced to sag so that the transmitting member 14 is moved thereby relieving the strain on the wire.

The displacement of the transmitting member 14 caused by the elastic member 11, eliminates the overstrain on the wire and the chain guide 9 is applied with only the reaction force of the elastic member subjected to the external bending force so that the linkage member 4 and the pins 3 and 7 are not damaged by the excessive strain imparted thereto. Furthermore, the energy for changing speed, stored at the transmitting member 14 and caused by the deformation of the elastic member 11, allows the chain guide 9 to be ready for shifting the drive chain so that upon rotation of the front gear by pedalling the energized elastic member 11 will restore to allow the linkage members 4 and 5 to be parallelogrammatically moved thereby shifting the drive chain into a high speed stage. This function is the same as that shown in FIGS. 1 to 4.

When in the form of a plate as aforesaid, the transmitting member 14 may be supported on the arm 12 instead of on the linkage member 5. In that case, a retainer 13 for the Bowden wire W at the arm 12 is utilized to pivotally support at a fixed shaft (not shown) of the retainer one end of the transmitting member 14 and an elastic member of a coil spring is inserted between the arm 12 and the transmitting member 14 so that the latter may elastically abut at the tip thereof against the linkage member 5.

In addition, a support 18 for an outer cable C is provided at the fixing member 1 and a tight bolt 19 is provided for the tighting band 1a.

As clearly understood from the above, the front derailleur of the invention is capable of changing the speed of a bicycle in a manner that during rotation of the front gear the Bowden wire is pulled to actuate the linkage members through the arm and the transmitting member without deformation thereof so that the chain guide may, as in the conventional method, be laterally moved to shift the drive chain. On the other hand, when the chain guide is imparted with a resistance greater than the predetermined value so as to be restrained from movement, such as in nonrotation of the front gear, the speed change is carried out by the displacement of the transmitting member so that the linkage members, the pivotting pins therefor and the Bowden wire may be prevented from being subjected to the pull action of the latter, thereby eliminating such problems as extension of the wire from overstrain thereof and breakdown of the linkage members or pins caused by excessive force applied thereto.

In addition, the stored energy caused by the displacement of the transmitting member, may carry out a desired speed change when the resistance imparted to the chain guide against the movement thereof is eliminated by virtue of, for example, starting of the front gear rotation.

Furthermore, the elastic displacement of the transmitting members, particularly, that caused by deformation of the elastic member, can be utilized for adjusting the stroke of the Bowden wire in excess of the predetermined range of pull length thereof so that the difference of the amount of extension and contraction of the wire may be absorbed by the displacement. As a result, the front derailleur of the invention has advantages in that it is not necessary (1) to adjust the relative length of the Bowden wire and the outer cable and (2) to provide any mechanism for the adjustment.

As many apparently widely different embodiments of this invention may be made without departing from the spirit and scope thereof, it is to be understood that the invention is not limited to the specific embodiment thereof except as defined in the appended claims.

What is claimed is:

1. A front derailleur for a bicycle for shifting a driving chain to one of two or more sprocket wheels of a front gear, said derailleur comprising:
    a fixing member secured to a bicycle frame;
    two linkage members pivotally connected to said fixing member;
    a chain guide pivotally connected to one end of each of said linkage members, said chain guide being laterally movable with respect to said fixing member through said linkage members to thereby guide the driving chain to be shifted;
    return springs for biasing said chain guide;
    an arm pivotally connected at one end thereof to said fixing member and having one end of a Bowden wire fixed to the other end thereof, said arm extending from said one end thereof in a direction away from said linkage members to the other end thereof;
    a leaf spring for transmitting the movement of said arm to said linkage members, one end of said leaf spring being secured to one of said arm and one of said linkage members and the other end of said leaf spring being in abutment with the other one of said arm and said one linkage member so that said leaf spring is movable with said arm, said leaf spring having an elastic force which is greater than that of said return springs whereby when resistance below a predetermined amount is applied to the guide frame the leaf spring transmits the movement of the arm to the linkage members to move the guide chain laterally and when resistance above the predetermined amount is applied to the guide frame the leaf spring is deformed and can not transmit the movement of the arm to the linkage members and stores the energy from its deformation to thereafter transmit the movement of the arm to the linkage members to move the guide frame laterally after the resistance goes below the predetermined amount.

2. The front derailleur for a bicycle according to claim 1, wherein the one end of said leaf spring is secured to said one of said linkage members and the other end thereof resiliently abuts against said arm.

3. The front derailleur for a bicycle according to claim 1, wherein the one end of said leaf spring is secured to said arm and the other end resiliently abuts against said one of said linkage members.

4. The front derailleur for a bicycle according to claim 9, wherein:
    said leaf spring is outwardly bowed at the other end thereof, and the one end of said leaf spring is secured to an outer surface of said one of said linkage members and the other outwardly bowed end of said leaf spring resiliently abuts against said arm.

5. The front derailleur for a bicycle according to claim 9, wherein the elastic force of said leaf springs is substantially twice that of said return springs.

* * * * *